Aug. 6, 1940.  C. R. DOWNS ET AL  2,210,656
AIR CONDITIONING SYSTEM
Filed June 8, 1935  2 Sheets-Sheet 1
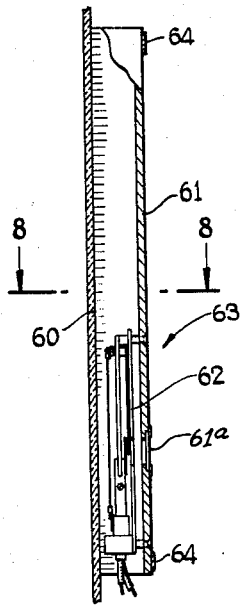
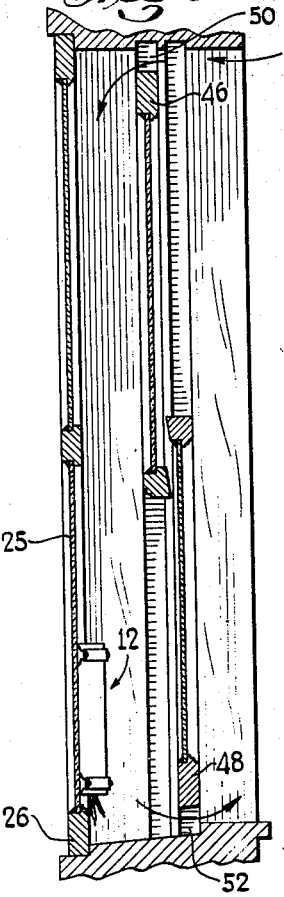
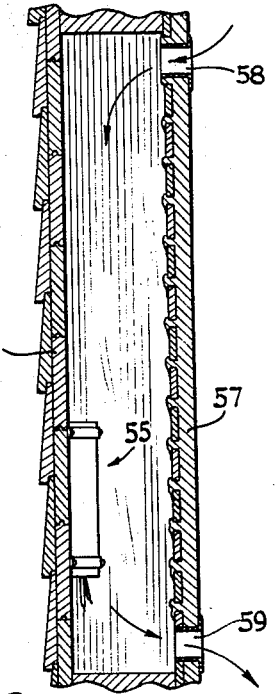
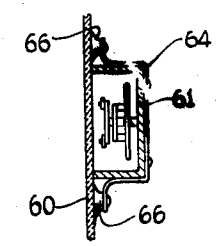
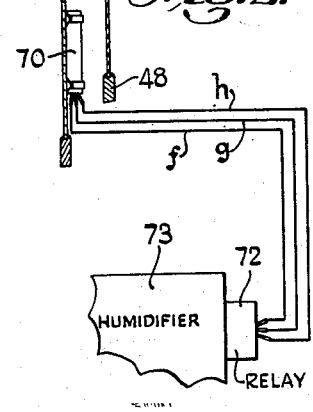
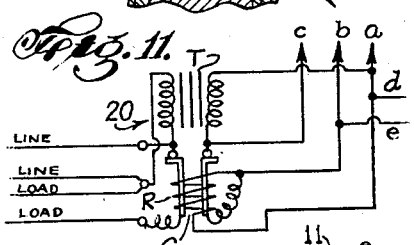
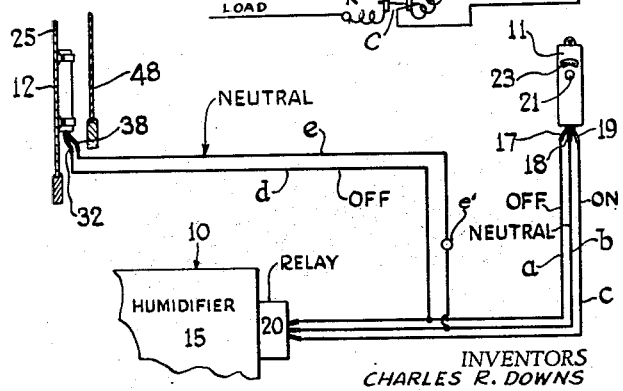
INVENTORS
CHARLES R. DOWNS
JOSEPH W. SPISELMAN
BY
Hammond & Littell
ATTORNEYS

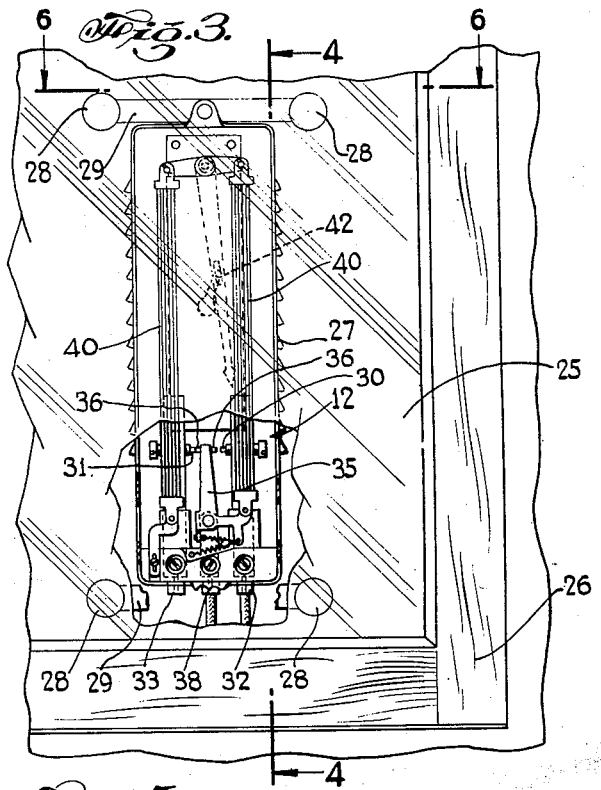
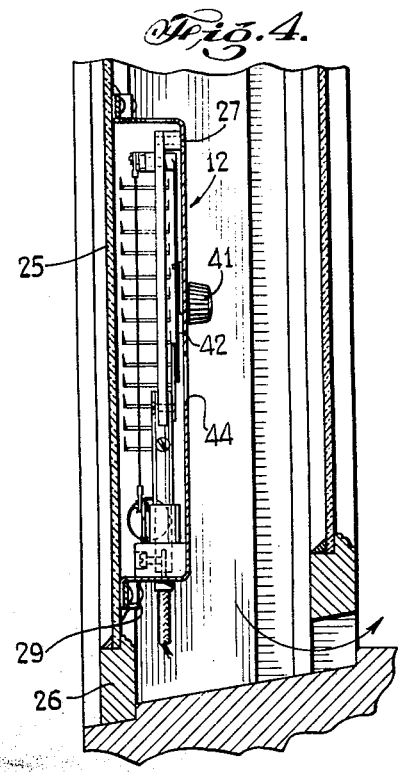
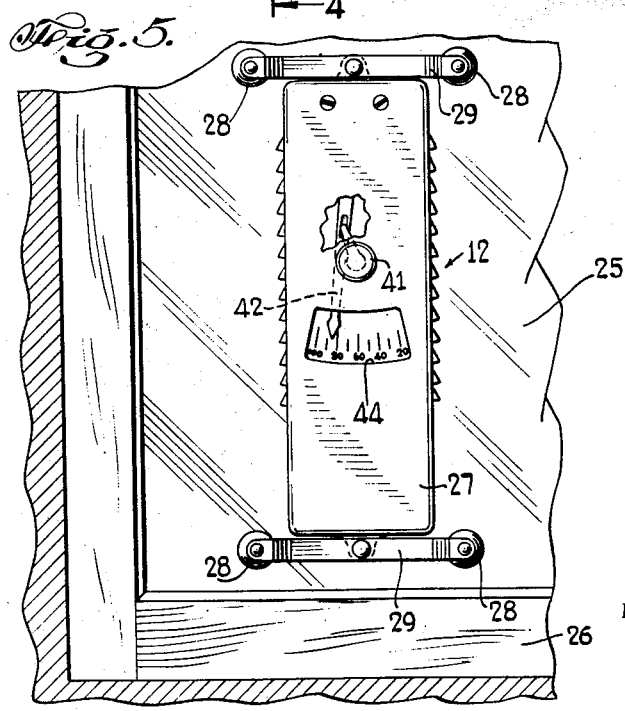
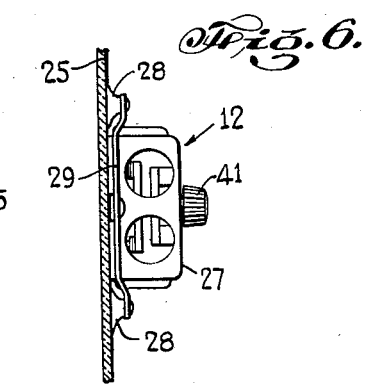

Patented Aug. 6, 1940

2,210,656

UNITED STATES PATENT OFFICE 2,210,656

AIR CONDITIONING SYSTEM

Charles R. Downs, Old Greenwich, Conn., and Joseph W. Spiselman, Brooklyn, N. Y.

Application June 8, 1935, Serial No. 25,596

15 Claims. (Cl. 236—44)

This invention relates to air conditioning and more particularly to the control of air humidity in desired correlation with changes of outdoor weather conditions.

The invention has been evolved in connection with the development of a system for controlling air conditioning apparatus as used in homes in cold weather but it will be understood that this embodiment is illustrative merely and that the invention is in no sense limited thereto but is capable of application wherever control of air conditioning apparatus in correlation with changes of outdoor weather conditions is desired.

In homes, offices and the like, when the indoor temperature is about 70° F. the maximum comfort is obtained if the relative humidity is around 50%, but if the temperature out of doors is low, as during cold winter weather, the moisture of the air inside may condense on or within the building structure causing dripping and damage and also on the window panes, which is objectionable because of the damage done to the window frames, window sills and curtains. For this reason it is desirable to vary the indoor humidity as outdoor weather conditions change to avoid such inside condensations as otherwise a change of outdoor conditions, particularly a fall of temperature, may cause excessive condensation of moisture on parts of the building structure.

While this type of control is more necessary where enclosed spaces are being humidified by air conditioning devices, it is also often desirable for use with dehumidifying air conditioning devices to remove the moisture discharged into the air by other sources in homes, kitchens and factories, in order to keep the humidity below that at which condensation takes place on the window panes or on other parts of the building structure exposed to weather influences.

Many attempts have been made to develop systems for controlling air conditioning apparatus whereby a lower humidity will be maintained within the building in proportion as the temperature out of doors is reduced. The development of these systems has met with serious difficulties because any empirical method of setting the relative humidity on the basis of the difference between the outdoor and indoor temperatures fails, because of the other variables which affect the allowable indoor relative humidity.

The present invention has for an object to provide an improved control system which operates directly in response to variations of humidity conditions within the room at the window or any other selected point which is, as nearly as possible, directly responsive to changes in outdoor weather conditions.

Another object is to provide such control of the indoor humidity as to provide a maximum of comfort consistent with a safe limit to the condensation of moisture on the window pane or other selected surface.

A further object of the invention is to provide a more sensitive control of relative humidity within an enclosure than can ordinarily be obtained with an average commercial humidostat by using such instruments in the manner heretofore usual.

A further object is to provide a control system comprising a humidostat positioned in the air at the house temperature to limit the maximum humidity thereof and a second humidostat positioned at the window and directly responsive to conditions which determine the amount of condensation of moisture on the window pane.

The present invention provides, in its preferred form, an arrangement whereby a change of conditions at the window pane or other cold surface, due for example to a drop of outside temperature or an increase of wind velocity or other change of conditions increasing the tendency of moisture to condense on the window pane will control the operation of the conditioning apparatus whether said apparatus operates to increase or decrease the relative humidity within the enclosure. The stopping of a humidifying apparatus or the starting of a dehumidifying air conditioning apparatus will result in reducing the humidity of the air within the house, thereby reducing the tendency to condensation of moisture on the window pane or other cool surface. In the system hereinafter specifically described a humidostat is positioned near or against a window.

This method of control and positioning of the humidistat at a cold surface results in a very sensitive control method and instrument. These instruments control on a basis of a fixed change or range of relative humidity. At lower temperatures it requires a smaller change in absolute humidity than at higher temperatures to yield a given change in relative humidity. This makes the window humidostat which operates at a lower than room temperature a more sensitive instrument for controlling the relative humidity change in the room itself.

Various other objects and advantages of the invention will appear as this description proceeds. In the accompanying drawings a selected embodiment of the invention is shown for the purposes of illustrating the principles of the invention.

Figure 1 is a diagrammatic view of an embodiment of the invention in which the control system of a humidifier comprises a wall humidostat for starting and stopping the operation of the humidifier and a second humidostat positioned at a window pane arranged to over-ride the control by the wall humidostat to shut off the humidifier at such time as conditions at the window pane indicate that condensation of moisture on the window pane is likely to occur;

Fig. 2 is a diagrammatic view similar to Fig. 1 of another embodiment of the invention in which window humidostat alone controls the operation of the humidifier;

Fig. 3 is a view of a humidostat showing the same applied to the pane of a storm window sash;

Fig. 4 is a vertical sectional view taken substantially on the line 4—4 of Fig. 3;

Fig. 5 is a view of the humidostat shown in Fig. 3, showing the same applied to a window pane;

Fig. 6 is a transverse sectional view taken substantially on the line 6—6 of Fig. 3;

Fig. 7 is a side elevation of a humidostat having an air current guiding casing applied to the interior face of a window pane, the casing being broken away to more clearly show the structure;

Fig. 8 is a sectional view taken substantially along the line 8—8 of Fig. 7;

Fig. 9 is a vertical sectional view taken through a window which is provided with a storm sash showing a humidostat applied to the window pane of the storm sash; and Fig. 10 is a fragmentary vertical sectional view taken through a double wall construction of a building showing a control humidostat applied to the outer wall thereof.

Fig. 11 is a diagrammatic view of the electrical circuit of the relay 20. This is a control assembly old in the art and sold as a unit.

In the preferred embodiment shown for the purposes of illustrating the principles of the invention, the air conditioning unit is controlled by an arrangement comprising a first humidostat subjected to air of substantially the average condition within the enclosure connected to exercise the main control over the humidifying device and a second humidostat subjected to air from the enclosure which is chilled to a degree depending upon the temperature of the outside air and arranged to exercise an over-riding auxiliary control.

The first humidostat is preferably arranged to control the maximum amount of moisture in the air within the enclosure and the second or auxiliary humidostat exercises over-riding control to temporarily stop the operation of the humidifying unit when the relative humidity at the cold surface exceeds a safe limit.

From a consideration of the detailed description of the invention as described below it will be apparent that a single humidostat properly installed in contact with a cold surface such as a window pane will operate to prevent undue condensation of moisture on the cold surfaces of a house structure. However, if the outdoor temperature is high such control will permit the indoor relative humidity to rise considerably in excess of the amount required for comfort and health. Then if there occurs a great and sudden drop in outdoor temperature the air and contents of the house will contain excessive quantities of moisture. This moisture will condense on the cold outside surfaces despite the fact that the humidifier is prevented from running by said humidostat. In order to prevent such common occurrences the first humidostat is preferably used to limit the maximum relative humidity of the air within the house. For example, if the first humidostat is set at 40% relative humidity the humidifier can never cause the air within the house to exceed that point and thereby prevents the storing up of moisture in the contents of the house to an excessive quantity. An embodiment of a unit suitable for use as a humidifying apparatus or alternatively as a dehumidifying apparatus is described in Letters Patent No. 2,026,936, granted January 7, 1936.

Referring more particularly to the drawings, an air conditioning unit 10 is shown diagrammatically in Fig. 1 as connected for control by a wall humidostat 11 (heretofore called first humidostat) which should be positioned where it will be subject to air of the average condition of that within the house and a window humidostat 12 (heretofore called second humidostat) which is placed against the inner surface of an outside window where it is exposed to air chilled by contact with the window surface responsive to changes in outside weather conditions.

The air conditioning unit 10 may comprise a humidifier or humidity modifying device 15 which is connected for control by the humidostats 11 and 12. The humidostats shown are of the three wire holding circuit type. The humidostat 11 is shown provided with three terminals 17, 18, 19 which are operatively connected by the leads a, b and c with a relay 20 which controls the operation of the humidifier 15. For clarity of description the leads a, b and c are labeled on the drawing off, neutral and on. The humidostat 11 is provided with a setting knob 21 and a visible window dial and pointer 23 in order that the humidostat may be set for any desired degree of relative humidity. When the relative humidity of air within the room is below the setting of the humidostat 11, the internal operative instrumentalities contained within the humidostat casing operate through a series of contacts (not shown) to cause electrical connection between the leads b and c. When such electrical communication is established, the relay 20 operates to set the humidifier 15 into operation to supply moisture to the room. When the relative humidity of air within the room reaches or exceeds the predetermined degree for which the humidostat 11 is set, electrical communication is established between the leads a and b and under such circumstances the relay 20 operates to suspended operation of the humidifier 15. The operation of one form of relay 20 is described in our copending application above referred to, it being sufficient hereto state that there is incorporated with this relay a holding circuit which maintains the humidifying apparatus in operation from the time the circuit between the leads b and c is broken until such time as electrical communication is established between the leads a and b. Likewise, during a fall of humidity within the room the humidifying apparatus is not set into operation immediately upon opening of the circuit between the leads a and b, such operation commencing only when the circuit between the leads b and c is closed. The arrangement of the humidostat 11 together with its leads a, b and c, the relay 20 and its relation to the humidifier 15, as described thus far, is old in the art.

In accordance with the present invention, in order that the humidity may be reduced upon a fall of outside temperature or upon other changes of conditions causing excessive precipitation of moisture upon the window pane, an overriding window humidostat is positioned on the inner face of the window pane which pane is exposed on its outer face to the effect of changes of outside temperature. The window selected is usually one of northern exposure but this will depend upon local conditions and the requirements of the case. As shown in Figs. 3, 4, 5 and 6, the humidostat 12 is placed upon the window pane 25 of the storm sash 26 and adjacent the bottom preferably at one side in order that the view from the window will not be obstructed. The humidostat 12 may be of any commercial type or may be especially designed for the purpose intended, but in the embodiment of the invention illustrated in Figs. 3, 4, 5 and 6, one commercial form of humidostat is shown in which the operative instrumentalities of the same are enclosed within a casing 27 which is preferably open at the top and bottom to permit circulation of air vertically therethrough. This casing is supported at its upper and lower ends by means of suction cups 28 carried by transverse bars 29 secured in any suitable manner to the casing. The humidostat 12 is provided with a pair of fixed contacts 30 and 31 which are electrically connected to respective binding posts 32 and 33 which project from the bottom of the casing. A pivoted arm 35 movable in response to changes of humidity carries a contact 36 which is adapted to selectively engage either the contact 30 or the contact 31 or to be disengaged from both depending upon the humidity. The arm 35 is electrically connected to a binding post 38 projecting from the bottom of the casing. The pivoted arm 35 is adapted to be actuated by a humidity responsive element 40 consisting of two parts which, when the casing 27 is in position on the window pane, occupies a position adjacent the window pane in close proximity thereto. In the particular arrangement shown in the drawings, the humidity responsive element lies about three-quarters of an inch from the window pane, although a closer proximity to the window pane may be desirable. A setting knob 41 mounted on the front of the casing 27 actuates a pointer 42 which is associated with a dial 44 also on the front of the casing for setting the humidostat at the relative humidity desired so that the contact 36 engages the contact 30 when the humidity of air reaching the humidostat 12 reaches the predetermined degree for which the humidostat is set.

Referring again to Fig. 1, the binding posts 32 and 38 are connected through respective leads $d$ and $e$ to the leads $a$ and $b$, respectively, an incandescent lamp bulb or other form of resistance $e'$ being used in the line $e$. The binding post 33 together with its associated contact 31 does not function electrically in the particular use to which the humidostat 12 is put in this form of the invention.

In order that the humidostat 12 shall function properly, to over-ride the humidostat 11 when there is danger of condensation of moisture at the window pane 25, a natural flow of air from the room is directed downwardly in close proximity to the pane and into contact with the humidity responsive element 40. This natural flow may be created in several ways, but in Fig. 9 advantage is taken of the use of the ordinary window sashes, designated at 46 and 48, as used in conjunction with the storm sash 26 to create this natural flow of air. Accordingly, the upper window sash 46 is moved downwardly from its closed position an inch or so to provide an opening 50 at the top of the window through which warm air from the room may pass into the space between the storm sash 26 and the window sashes 46 and 48. Similarly, the lower window sash 48 may be moved upwardly an inch or two from its closed position to provide a space 52 through which cooled air may pass from the space between the storm and window sashes into the room. Air passing through the opening 50 from the room into the space between the storm and window sashes will be chilled by contact with the window pane 25 and upon chilling will condense in volume and displace the air therebeneath, thus setting up a downward draft or flow within the space between the storm sash and window sashes. As the air moves downwardly along the surface of the storm sash window pane 25, it is progressively chilled and as its temperature drops, the relative humidity thereof increases. If the air entering through the opening 50 possesses a sufficiently high moisture content so that there would be danger of condensation of moisture on the window panes of the enclosure, by the time it has moved down the window pane 25 and into contact with the humidity sensitive element 40 of the humidostat, it will have its relative humidity raised sufficiently to cause the humidostat 12 to be actuated to close contacts 36 and 30, thus establishing electrical connection between the leads $d$ and $e$. Care should be taken to cause a slow flow of air past the humidostat so that the air adjacent the same will approach the temperature of the inside surface of the window pane 25 rather than the temperature of the air inside the building. Since, electrical communication between the leads $a$ and $b$ of the humidostat 11 serves to suspend the operation of the humidifier the establishing of an electrical connection between the leads $d$ and $e$ which are connected to the leads $a$ and $b$ will in effect short circuit the leads $a$ and $b$ and accomplish the same result as though the leads $a$ and $b$ were directly connected thus stopping the operation of the humidifier.

A standard and well known form of holding circuit is shown in Fig. 11. The circuit includes a holding relay R which in its uppermost position closes the power circuit to maintain the humidifying apparatus in operation. When an electrical connection is made between the leads $a$ and $b$ by either humidostat, the holding coil C is short circuited and the current therein reduced enough to cause the power current to be shut off and the humidifier stopped. When connection is made between the leads $b$ and $c$, the coil C is energized to close the relay if, but only if, there is no connection between leads $a$ and $b$. If there should be a connection between leads $b$ and $c$ through the humidostat 11 and between leads $e$ and $d$ through the humidostat 12, the current in holding coil C would be short circuited and flow from $a$ to $c$ through the transformer coil and cause the power to be shut off and the humidifier to be stopped but there is a short circuit across the transformer within the relay. The incandescent lamp bulb or other form of resistance $e'$ in the line is sufficient to limit the current drain on the transformer when the transformer is so short circuited, but will, however, pass sufficient current to de-magnetize the holding coil and release the relay when it is operatively connected in circuit.

In the form of the invention shown in Fig. 10, a humidostat 55 is shown as positioned on the outer wall 56 of a typical double wall building construction, the inner wall being designated at 57. An opening 58 is provided in the inner wall 57 a distance above the humidostat 55. Similarly an opening 59 is provided through the wall 57 below the humidostat 55. Since the exterior of the wall 56 is exposed to outside air and chilled thereby, air entering through the opening 58 and striking this wall 56 will become chilled and moved downwardly thus creating a natural draft or flow in identically the same manner as previously described in connection with the form of the invention shown in Fig. 9. When the moisture content of the air entering through the opening 58 is sufficiently high so that ordinary condensation of moisture would occur on surfaces similar to wall 56, the relative humidity of air striking the wall 56 being increased as the air moves downwardly there-along, the humidostat 55 will be actuated to override the humidostat 11 and cause stopping of the humidifier in the manner set forth above.

In Fig. 7 a natural draft or flow of air along an ordinary window pane 60 not provided with a storm sash is created by artificial means. Such means comprises an elongated open ended casing 61 in which the operative instrumentalities 62 of a humidostat 63 are installed adjacent the bottom thereof. A pair of strips or keepers 64 envelop the casing 61 at the top and bottom thereof and are provided with suction cups 66 at their ends for attachment to the window pane. When in position on the window pane, the humidity responsive element of the mechanism is in close proximity to the same. A sight window 61a permits observation and setting of the humidostat. In this form of the invention air entering the top of the casing 61 is chilled as it strikes the cold window pane and moves downwardly while its relative humidity is at the same time increased. If such increase in relative humidity is sufficiently great so that condensation of moisture would ordinarily occur on the window pane, the humidity sensitive element of the humidostat being in the field of greatest relative humidity causes the humidostat to be actuated to close an electrical circuit between the leads d and e to shut off the humidifying apparatus 15.

When the cold weather conditions in a particular locality or the structures to be humidified are such that the more complete humidity control provided by the system embodied in Figure 1 is not necessary, the installation shown in Fig. 2 is employed. In this form of the invention, if the room is provided with a window that is equipped with a storm sash, a humidostat 70 similar to the humidostat 12 is positioned on the inside of the pane 25 thereof adjacent the bottom and to one side. If the window is not provided with a storm sash, a humidostat similar to the humidostat 63 is similarly positioned on the window pane 60. If the installation is to be made with the humidostat positioned between the inner and outer walls of a double wall construction, a humidostat similar to the humidostat 55 is employed. In this form of the invention, the humidostat 70, regardless of the particular installation, is of the three-wire holding-circuit type which may be of the same type as that shown in Figs. 3 to 6 wherein the binding posts 33, 38 and 32 are electrically connected to leads f, g and h, respectively, which are in turn operatively connected to the relay 72 which controls the operation of the humidifying apparatus 73. The humidostat 70 is set at a relative humidity of for example 90%, and the wall or so-called first humidostat is not used.

The humidity responsive element 40 is positioned in close proximity to the surface that is chilled by the outside atmosphere, whether it be the pane 25 of the storm sash 26, the window pane 60, or the exterior wall 56 of the building, and when the relative humidity of the chilled air coming into contact with this element 40, by virtue of the artificially created draft provided, is below the predetermined degree for which the humidostat is set, the contact 36 on the contact arm 35 engages the contact 31, thus establishing electrical communication between the leads g and h. These leads are so connected to the circuit of the relay 72 that when electrical communication is established between them, the relay operates to set the humidifying apparatus into operation. When the humidity of air reaching the humidity sensitive element 40 rises above the degree for which the humidostat is set, the contact 36 leaves the contact 31, but due to the holding circuit of the relay 72, the humidifying apparatus continues to function until contact is established between the contact 36 and the contact 30 at which time electrical communication is established between the leads f and g, to stop the operation of the humidifying apparatus. By this arrangement rapid intermittent starting and stopping of the humidifying apparatus, commonly known as fluttering, upon trivial changes in relative humidity is prevented. The interim between the time the contact 36 leaves the contact 31 and the time it engages the contact 30 may correspond with a rise of four or five percent in relative humidity of air reaching the humidity sensitive element 40 or it may represent a greater change depending upon the construction and setting of the humidostat.

While we have described our invention as used particularly in connection with the humidifying feature of an air conditioning unit of the type described in our Patent No. 2,174,186, granted September 26, 1939, it will be obvious that the invention is also usable to control the operation of the dehumidifying feature of said unit.

By the term humidostat as used in the specification and claims, we mean an instrument for the measuring of relative humidity and the transmission of controlling impulses actuated by an element which changes in dimension with changes in relative humidity by absorption or desorption of moisture in the element as the relative humidity of the surrounding air changes.

The foregoing particular description is illustrative merely and is not intended as defining the limits of our invention, which as will be apparent may be applied in various ways to control indoor conditioning apparatus in response to variation in outdoor weather conditions.

We claim:

1. An apparatus for controlling the humidity within an enclosure comprising in combination, an air conditioning apparatus and means for controlling said apparatus comprising a humidostat exposed to the air of substantially average condition within the enclosure and connected normally to control the air conditioning apparatus, and a second humidostat exposed to air drawn from within the enclosure and cooled to a degree depending upon the exterior temperatures, said second humidostat being connected to control the air conditioning apparatus and to supplant the control by the first humidostat under predetermined conditions.

2. A system for conditioning the air within an enclosure comprising an air humidifying apparatus, a humidostat exposed to the air of substantially average condition within the enclosure and connected normally to control the air conditioning apparatus, means for cooling a portion of the air within the room to a degree depending upon the outside temperature and a second humidostat exposed to the such cooled air, the first humidostat being connected to start and stop the action of the humidifying apparatus in response to predetermined conditions and the second humidostat being connected to supplant the control by the first humidostat and to stop the action of the humidifying apparatus when the relative humidity of the cooled air exceeds a selectable predetermined degree.

3. A system for controlling the humidity within an enclosure comprising, in combination, an air conditioning apparatus and means for controlling said apparatus comprising a humidostat exposed to the air of substantially average condition within the room, and arranged to control the air conditioning apparatus in response to predetermined maximum and minimum humidity conditions, a second humidostat exposed to air drawn from within the room and cooled to approximately the temperature of the coldest part of the room and arranged to override the control by the first humidostat and to control the conditioning apparatus in response to selectable predetermined maximum humidity conditions.

4. A system for controlling the amount of moisture added to air within an enclosure having an interior surface responsive to exterior changes in temperature comprising a humidifying apparatus for supplying moisture to the air within said enclosure, a humidostat positioned within said enclosure for suspending operation of said humidifying apparatus when the relative humidity of air within said enclosure reaches a predetermined degree, and a second humidostat positioned in close proximity to said surface and responsive to the relative humidity of air adjacent said surface said second humidostat being arranged to override control by the first humidostat and to suspend operation of said humidifying apparatus when the relative humidity of air adjacent said surface reaches a higher predetermined degree.

5. A system for controlling the amount of moisture added to air in winter within an enclosure having an interior surface responsive to exterior changes in temperature comprising a humidifying apparatus for supplying moisture to the air within said enclosure, a humidostat positioned within said enclosure and adapted to suspend operation of said humidifying apparatus when the relative humidity of air within said enclosure reaches a predetermined degree, means for directing a stream of air from within said enclosure into contact with said surface whereby the air is chilled more or less depending upon the exterior temperature and the relative humidity thereof is correspondingly raised, and a second humidostat positioned in said stream and adapted to override the first humidostat and to suspend operation of said humidifying apparatus when the relative humidity of air within said stream reaches a selectable predetermined point.

6. As an article of manufacture, a humidostat having its humidity responsive element located near the inside surface of a window pane the outside surface of which is exposed to outside weather conditions, means to support said humidostat adjacent said window pane, and means to direct currents of air flowing along the inside of said window past said humidity responsive element.

7. As an article of manufacture, a casing having an open front, a humidity responsive element in said casing facing toward the open front thereof, control means operated by said humidity responsive element, means to support said casing with the open front thereof against a window pane and means to permit air circulating along said window pane to enter said casing.

8. In an air conditioning system, a humidifier adapted to humidify an enclosure, a humidity actuated regulator connected to said humidifier for controlling the latter and located at a point of average humidity in said enclosure to be air conditioned for maintaining said humidity at a desired average, and a second humidity actuated regulator located within said enclosure and adjacent to a surface which is adapted to become chilled, said second regulator being so set and connected to said first mentioned regulator in such a manner as to render the latter inoperative to control the humidifier when said surface becomes chilled, whereby condensation of moisture on said chilled surface is prevented.

9. Humidity control apparatus comprising means for supplying moisture to the air of a heated room having an observation surface, a portion of which is exposed to outdoor temperature, means responsive to the humidity of the air within the room for controlling said moisture supplying means, and means responsive to the humidity of the air at the observation surface and arranged to override control by the first humidity responsive means for controlling the moisture supplying means whereby the humidity of the air within the room is maintained at a desired value while condensation of moisture on the observation surface is prevented.

10. A system for controlling the amount of moisture added to air within an enclosure having a window exposed to changes in temperature outside said enclosure, comprising a humidifying apparatus for supplying moisture to air within said enclosure, means responsive solely to the relative humidity of the air within said enclosure and adapted to suspend operation of said humidifying apparatus when the humidity of the air within said enclosure reaches a predetermined degree, a second means responsive solely to the relative humidity of air having its humidity responsive element located adjacent said window, adapted to override the first humidity responsive means and to suspend operation of said apparatus when the humidity of the air reaching said second humidity responsive means approaches the saturation point, and means for directing a stream of air from said enclosure into contact successively with the window and said last mentioned humidity responsive means.

11. A system for controlling the moisture added to air within a heated enclosure below an amount sufficient to condense upon the cooler exterior walls thereof which comprises a humidifying apparatus, for supplying moisture to said air in excess of the amount required, a humidostat exposed to the cooling effect of an interior surface of said exterior walls and separated from the enclosure by a partition provided with openings for the passage of air of the enclosure into contact successively with said surface and with the humidostat by thermal circulation, and means for controlling said apparatus by the action of said humidostat.

12. As an article of manufacture, a humidostat having its humidity responsive element located near the inside surface of an enclosure partition, the outside surface of which is exposed to outside weather conditions, means to support said humidostat adjacent said enclosure partition, and means to direct currents of air flowing along the inside of said enclosure partition past said humidity responsive element.

13. As an article of manufacture, a humidostat having its humidity responsive element located near one side of an enclosure partition, the opposite side of which is exposed to vary temperature conditions, means to support said humidostat adjacent said enclosure partition, and means to direct currents of air successively in contact with said first side of said enclosure partition to vary their temperature corresponding to said varying temperature conditions and past said humidity responsive element.

14. In an air conditioning system, an electrically controlled humidifier, a humidity actuated regulator electrically connected to said humidofier for controlling the latter in response to one condition of relative humidity, and a second humidity actuated regulator electrically connected with said humidifier and said first regulator to render the latter inoperative in response to another condition of relative humidity.

15. In an air conditioning system, a humidifier, a humidity actuated regulator connected to said humidifier and set to control the latter to maintain the relative humidity at a desired average, and a second humidity actuated regulator connected with said humidifier and first regulator and set to respond to a higher relative humidity than the first regulator to render the latter inoperative.

CHARLES R. DOWNS.
JOSEPH W. SPISELMAN.

CERTIFICATE OF CORRECTION.

Patent No. 2,210,656. August 6, 1940.

CHARLES R. DOWNS, ET AL.

It is hereby certified that error appears in the printed specification of the above numbered patent requiring correction as follows: Page 2, second column, line 57, for the word "suspended" read --suspend--; page 6, first column, line 19, claim 13, for "vary" read --varying--; and that the said Letters Patent should be read with this correction therein that the same may conform to the record of the case in the Patent Office.

Signed and sealed this 10th day of September, A. D. 1940.

(Seal)

Leslie Frazer,
Acting Commissioner of Patents.